(12) United States Patent
Chan

(10) Patent No.: US 7,813,099 B2
(45) Date of Patent: Oct. 12, 2010

(54) POWER LINE OUTLET STRIP AND METHOD FOR POWERLINE COMMUNICATIONS

(75) Inventor: Tat Keung Chan, So. San Francisco, CA (US)

(73) Assignee: Asoka USA Corporation, Foster City, CA (US)

(*) Notice: Subject to any disclaimer, the term of this patent is extended or adjusted under 35 U.S.C. 154(b) by 1114 days.

(21) Appl. No.: 11/325,096

(22) Filed: Jan. 3, 2006

(65) Prior Publication Data

US 2007/0156927 A1    Jul. 5, 2007

(51) Int. Cl.
*H01C 7/12*      (2006.01)
*H02H 1/00*      (2006.01)
*H02H 1/04*      (2006.01)
*H02H 3/22*      (2006.01)
*H02H 9/06*      (2006.01)
*H04B 1/034*     (2006.01)

(52) U.S. Cl. .................... 361/119; 361/118; 455/128
(58) Field of Classification Search .................. 361/119
See application file for complete search history.

(56) References Cited

U.S. PATENT DOCUMENTS

| | | | |
|---|---|---|---|
| 6,130,896 A | 10/2000 | Lueker et al. | |
| 6,188,557 B1 | 2/2001 | Chaudhry | |
| 6,243,413 B1 | 6/2001 | Beukema | |
| 6,388,564 B1 | 5/2002 | Piercy et al. | |

(Continued)

FOREIGN PATENT DOCUMENTS

DE    100 08 602 A1    6/2001

(Continued)

OTHER PUBLICATIONS

Evans; "The CEBus Standard User's Guide, The Training Department Publications, May 1996.".

*Primary Examiner*—Jared J Fureman
*Assistant Examiner*—Dharti H Patel
(74) *Attorney, Agent, or Firm*—Baker Botts L.L.P.

(57) ABSTRACT

A powerstrip apparatus having powerline networking capability. The apparatus has a housing member, which an outer region and an inner region. An AC power line is coupled to the housing member. In a specific embodiment, the AC powerline includes a male connector device, e.g., two prong, three prong. The apparatus has a surge protector coupled to the AC power line. The surge protector is within a first portion of the inner region of the housing member. The apparatus has one or more AC power outlets coupled to the surge protector. The one or more AC power outlets is spatially disposed on a first portion of the outer region of the housing member. An on/off switch is coupled between the one or more AC power outlets and the surge protector. A power line device is coupled to the AC powerline. The power line device is adapted to process a data signal from the AC powerline in a first format to a second format. A switching power supply is coupled to the AC powerline. The switching power supply is adapted to convert an AC power signal into a DC signal for use with the power line device. The apparatus also has a first output port coupled to an first input/output of the PLC device and may also have an Nth output port coupled to a second input/output of the PLC device; where N is an integer greater than 1.

11 Claims, 9 Drawing Sheets

U.S. PATENT DOCUMENTS

| | | |
|---|---|---|
| 6,560,319 B1 | 5/2003 | Binder |
| 6,668,058 B2 | 12/2003 | Grimes |
| 6,741,162 B1 * | 5/2004 | Sacca et al. ............... 307/3 |
| 6,757,368 B2 | 6/2004 | Binder |
| 6,759,946 B2 | 7/2004 | Sahinoglu et al. |
| 6,775,121 B1 | 8/2004 | Chaudhry |
| 6,842,459 B1 | 1/2005 | Binder |
| 6,885,674 B2 | 4/2005 | Hunt et al. |
| 6,904,134 B2 | 6/2005 | Jeon et al. |
| 6,927,340 B1 | 8/2005 | Binder et al. |
| 6,947,409 B2 | 9/2005 | Iwamura |
| 6,958,680 B2 | 10/2005 | Kline |
| 6,965,302 B2 | 11/2005 | Mollenkopf et al. |
| 7,007,305 B2 | 2/2006 | Carson et al. |
| 7,016,368 B2 | 3/2006 | Binder |
| 7,027,483 B2 * | 4/2006 | Santhoff et al. ............ 375/130 |
| 7,035,280 B2 | 4/2006 | Binder |
| 7,095,756 B2 | 8/2006 | Binder |
| 7,136,936 B2 | 11/2006 | Chan et al. |
| 2002/0014972 A1 | 2/2002 | Danielson et al. |
| 2004/0001440 A1 | 1/2004 | Kostoff, II et al. |
| 2004/0125870 A1 | 7/2004 | Yamazaki |
| 2006/0072269 A1 * | 4/2006 | Staples ................... 361/93.1 |

FOREIGN PATENT DOCUMENTS

| | | |
|---|---|---|
| DE | 100 12235 C2 | 12/2001 |
| DE | 100 47648 A1 | 4/2002 |
| DE | 101 0353 A1 | 8/2002 |
| DE | 100 59564 A1 | 9/2002 |
| DE | 101 19039 A1 | 12/2002 |
| DE | 10119040 A1 | 12/2002 |
| DE | 100 42958 C2 | 1/2003 |
| EP | 0 822 721 A2 | 2/1998 |
| EP | 1 043 866 A2 | 10/2000 |
| EP | 1 251 646 A2 | 10/2002 |
| WO | WO 01/63787 A1 | 8/2001 |
| WO | WO 02/37712 A1 | 5/2002 |

* cited by examiner

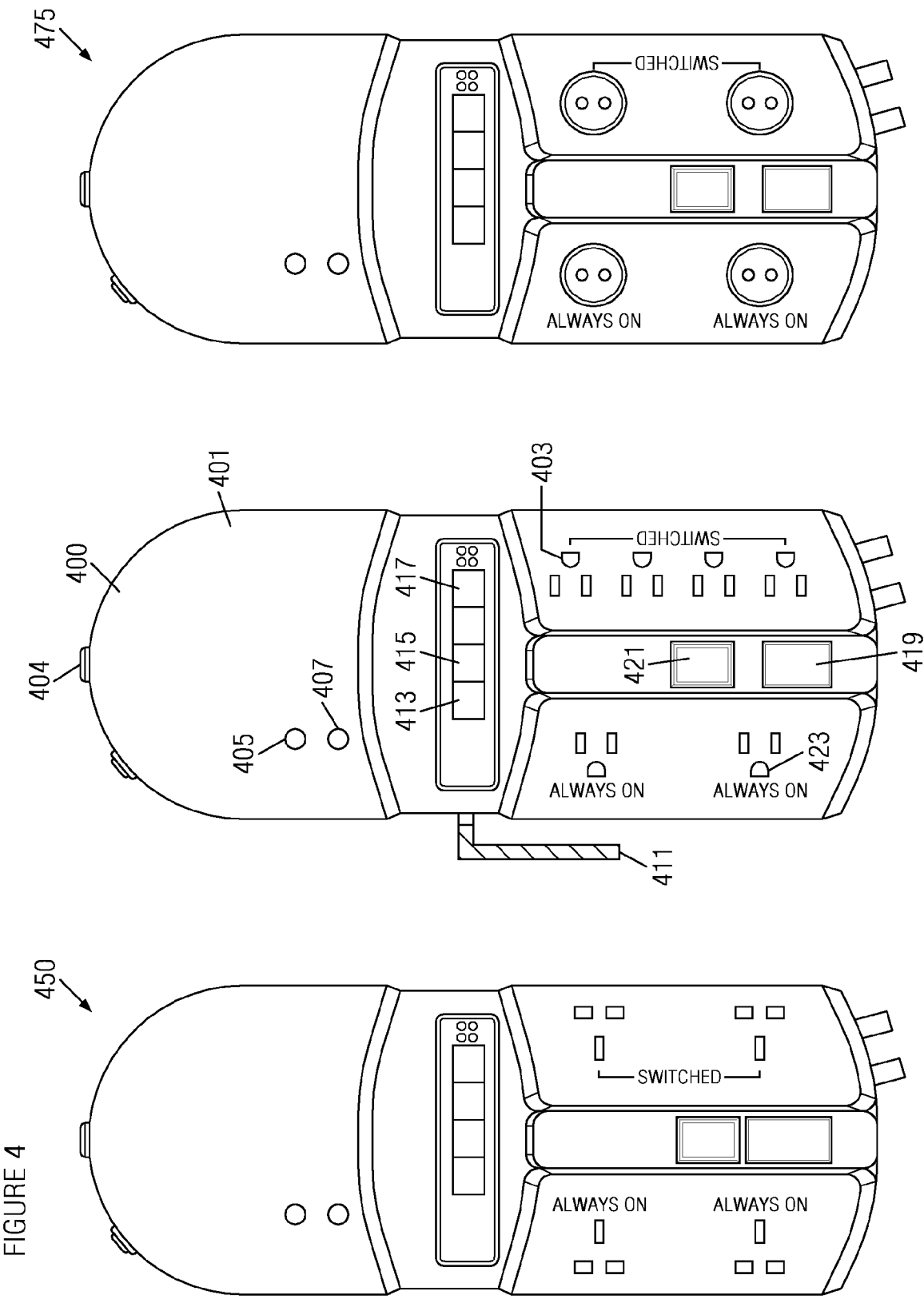

POWER LINE OUTLET STRIP AND METHOD FOR POWERLINE COMMUNICATIONS

BACKGROUND OF THE INVENTION

The present invention relates generally to power line networking techniques. More particularly, the invention provides an apparatus for a high speed power line network using a power plug outlet strip for a computing environment. Merely by way of example, the invention has been applied in a local area network environment, but it would be recognized that other applications exist. The invention can also be applied to building area networking, home networking, office networking, apartments, any combination of these, and other networking applications.

Telecommunication techniques have been around for numerous years. In the early days, a communication technique known as telegraph was developed. Telegraph generally transferred information from one geographical location to another geographical location using electrical signals in the form of "dots" and "dashes" over transmission lines. An example of commonly used electrical signals is Morse code. Telegraph has been, for the most part, replaced by telephone. The telephone was invented by Alexander Graham Bell in the 1800s to transmit and send voice information using electrical analog signals over a telephone line, or more commonly a single twisted pair copper line. Most industrialized countries today rely heavily upon telephone to facilitate communication between businesses and people, in general.

In the 1990s, another significant development in the telecommunication industry occurred. People began communicating to each other by way of computers, which are coupled to the telephone lines or telephone network or other communication network. These computers or workstations coupled to each other can transmit many types of information from one geographical location to another geographical location. In general, there has been various types of computer networks, including local area networks, commonly called LANs, and wide are networks, commonly called WANs.

Local area networks have been used to connect computers in a smaller geographic region than wide area networks. Most local area networks rely upon dedicated cables to transmit the communication signals through the network. An alternative way of transmitting such communication signals through non-dedicated cables but through a power supply network is referred to as Power line Communication, commonly called PLC. Power line communication relies upon pre-existing power lines that are used to supply electrical power distributed through buildings, such as homes and office structures. Conventional PLC relies upon radio frequency technologies. Although power line communications have been successful in part, many limitations still exist.

For example, power line communication generally has limited capability due to lack of infrastructure. That is, power line networking has not been "mainstream," Power line networking has little or almost no infrastructure. Additionally, power line network devices are lacking and simply do not exist on a wide scale. In conventional office settings in the United States, power line networking is absent and almost non-existent. These and other limitations have been described throughout the present specification and more particularly below.

From the above, it is seen that improved techniques for power line networks are highly desired.

BRIEF SUMMARY OF THE INVENTION

According to the present invention, techniques for power line networking techniques are provided. More particularly, the invention provides an apparatus for a high speed power line network using a power plug outlet strip for a computing environment. Merely by way of example, the invention has been applied in a local area network environment, but it would be recognized that other applications exist. The invention can also be applied to building area networking, home networking, office networking, apartments, any combination of these, and other networking applications.

In a specific embodiment, the present invention provides a powerstrip apparatus having powerline networking capability. The apparatus has a housing member, which includes an outer region and an inner region. The apparatus has an AC power line coupled to the housing member. In a specific embodiment, the AC powerline includes a male connector device. The apparatus has a surge protector coupled to the AC power line, e.g., 100-240 Volts 50-60 Hz. In a specific embodiment, the surge protector is within a first portion of the inner region of the housing member. The apparatus has one or more AC power outlets coupled to the surge protector. In a specific embodiment, the one or more AC power outlets is spatially disposed on a first portion of the outer region of the housing member. An on/off switch is coupled between the one or more AC power outlets and the surge protector. A power line device is coupled to the AC powerline. The power line device is adapted to process a data signal from the AC powerline in a first format to a second format. A switching power supply (or other type of power supply) is coupled to the AC powerline. The switching power supply is adapted to convert an AC power signal into a DC signal for use with the power line device. A multi-port switch is coupled to the power line device. The multi-port switch is adapted to couple to the data signal in the second format. In a specific embodiment, the multiport switch has a first output and an Nth output, where N is an integer greater than 1.

In an alternative specific embodiment, the present invention provides a powerstrip apparatus having powerline networking capability. The apparatus has a housing member, which an outer region and an inner region. An AC power line is coupled to the housing member. In a specific embodiment, the-AC powerline includes a male connector device, e.g., two prong, three prong. The apparatus has a surge protector coupled to the AC power line. The surge protector is within a first portion of the inner region of the housing member. The apparatus has one or more AC power outlets coupled to the surge protector. The one or more AC power outlets is spatially disposed on a first portion of the outer region of the housing member. An on/off switch is coupled between the one or more AC power outlets and the surge protector. A power line device is coupled to the AC powerline. The power line device is adapted to process a data signal from the AC powerline in a first format to a second format. A switching power supply is coupled to the AC powerline. The switching power supply is adapted to convert an AC power signal into a DC signal for use with the power line device. The apparatus also has a first output port coupled to an first input/output of the PLC device and may also have an Nth output port coupled to a second input/output of the PLC device; where N is an integer greater than 1.

In yet an alternative specific embodiment, the present invention provides a method of using a power strip apparatus having power line networking capability. The method includes providing a housing member, which has an outer region and an inner region. The method includes supplying AC power to the power line and through a surge protector coupled to the AC power line. The method also includes transferring the AC power from the powerline after the surge protector to one or more AC power outlets coupled to the surge protector. Concurrent with the AC power in a specific embodiment, the method includes transferring a data signal in a first format from the AC power line to a power line device coupled to the AC power line. The method includes transferring one or more first portions of the data signal in the second format to a first output port coupled to an first input/output of the PLC device and transferring one or more Nth portions of the data signal in the second format to an Nth output port coupled to a second input/output of the PLC device; where N is an integer greater than 1. Of course, there can be other variations, modifications, and alternatives.

In a specific embodiment, the terms "first," "second," "third," and "Nth" as used herein are not intended to be limiting but should be interpreted by their ordinary meanings. Additionally, the term "device" and "apparatus" should also be interpreted under their ordinary meanings. In a specific embodiment, the term "device" can be interpreted as a stand alone semiconductor chip and/or chips provided in a module. Alternatively, the term "module" can include one or more chips and other electronic devices according to a specific embodiment. Of course, there can be other variations, modifications, and alternatives.

One or more benefits can be achieved using the present invention over conventional techniques. The present invention can be applied using conventional components from computer networking and hardware technologies. Additionally, the invention can be applied to pre-existing power line structures without substantial modification. Preferably, the present system and method are easy to implement and also allows for power line networking capabilities and power plug abilities using the same apparatus according to a specific embodiment. In a preferred embodiment, the present invention can provide an improved power strip apparatus that has multiple communication output ports and AC power capabilities, which do not interfere with the communication ports via noise filter. Depending upon the embodiment, one or more of these benefits may exist. These and other benefits have been described throughout the present specification and more particularly below.

Various additional objects, features and advantages of the present invention can be more fully appreciated with reference to the detailed description and accompanying drawings that follow.

BRIEF DESCRIPTION OF THE DRAWINGS

FIG. 4 is a simplified front view-diagram of a power line strip (or strips) according to an embodiment of the present invention;

DETAILED DESCRIPTION OF THE INVENTION

According to the present invention, techniques for power line networking techniques are provided. More particularly, the invention provides an apparatus for a high speed power line network using a power plug outlet strip for a computing environment Merely by way of example, the invention has been applied in a local area network environment, but it would be recognized that other applications exist. The invention can also be applied to building area networking, home networking, office networking, apartments, any combination of these, and other networking applications.

Figure 1:
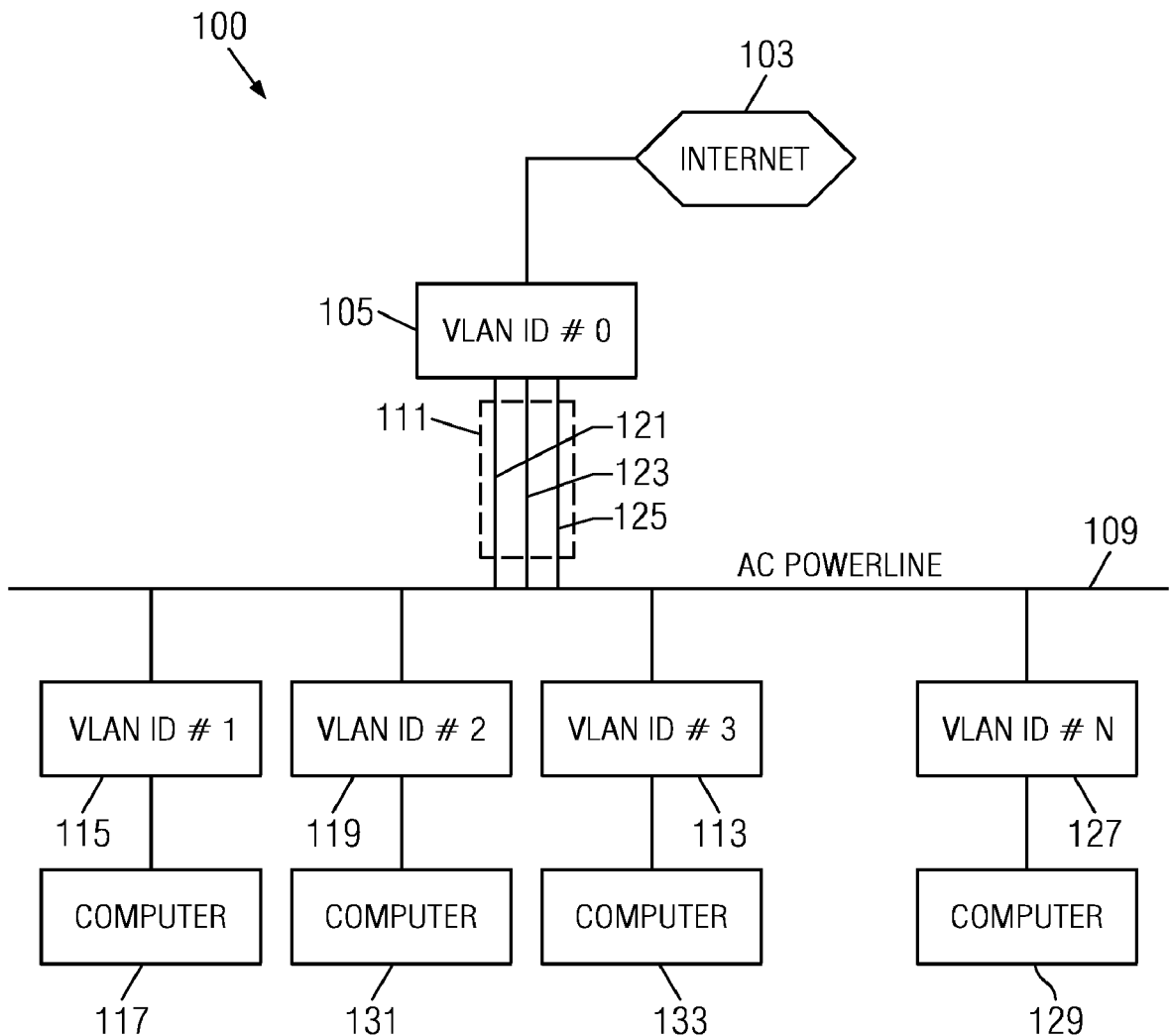
FIG. 1 is a simplified diagram of a power line system according to an embodiment of the present invention.

FIG. 1 is a simplified diagram of a power line system according to an embodiment of the present invention. This diagram is merely an example, which should not unduly limit the scope of the claims herein. One of ordinary skill in the art would recognize many variations, alternatives, and modifications. As shown, the system 100 for power line networking is included. The system 100 has an external data source 103, which is derived from a world wide networks of computers. As merely an example, the data source can be the Internet or other like entity. The system includes a first power line 121, a second power line 123, and a third power line 125, each of which corresponds to a phase. Each of the power lines is often bundled together and represented by reference numeral 111.

Referring again to FIG. 1, the system includes a gateway 105 coupled between the data source 103 and an AC power line 109 according to a specific embodiment. The AC power line 109 couples to a plurality of power line devices 115, 119, 113, 127 numbered from 1 through N, where N is an integer greater than 2, according to a specific embodiment. Each of the power line devices is coupled to a client device 117 or a plurality of client devices to define a "segment" on the power line network. As shown, power line device 119 couples to client device 131. Power line device 113 couples to client device 133. Power line device 127 couples to client device 129. Depending upon the specific embodiment, the client device can be a personal computer, a wireless device, a lap top computer, an Internet phone, an Internet appliance (e.g., refrigerator, stereo, television set, clock, digital paintings), any combinations of these, and others. Of course, one of ordinary skill in the art would recognize. Further details of the gateway and power line device can be found throughout the present specification and more particularly below.

Figure 2:
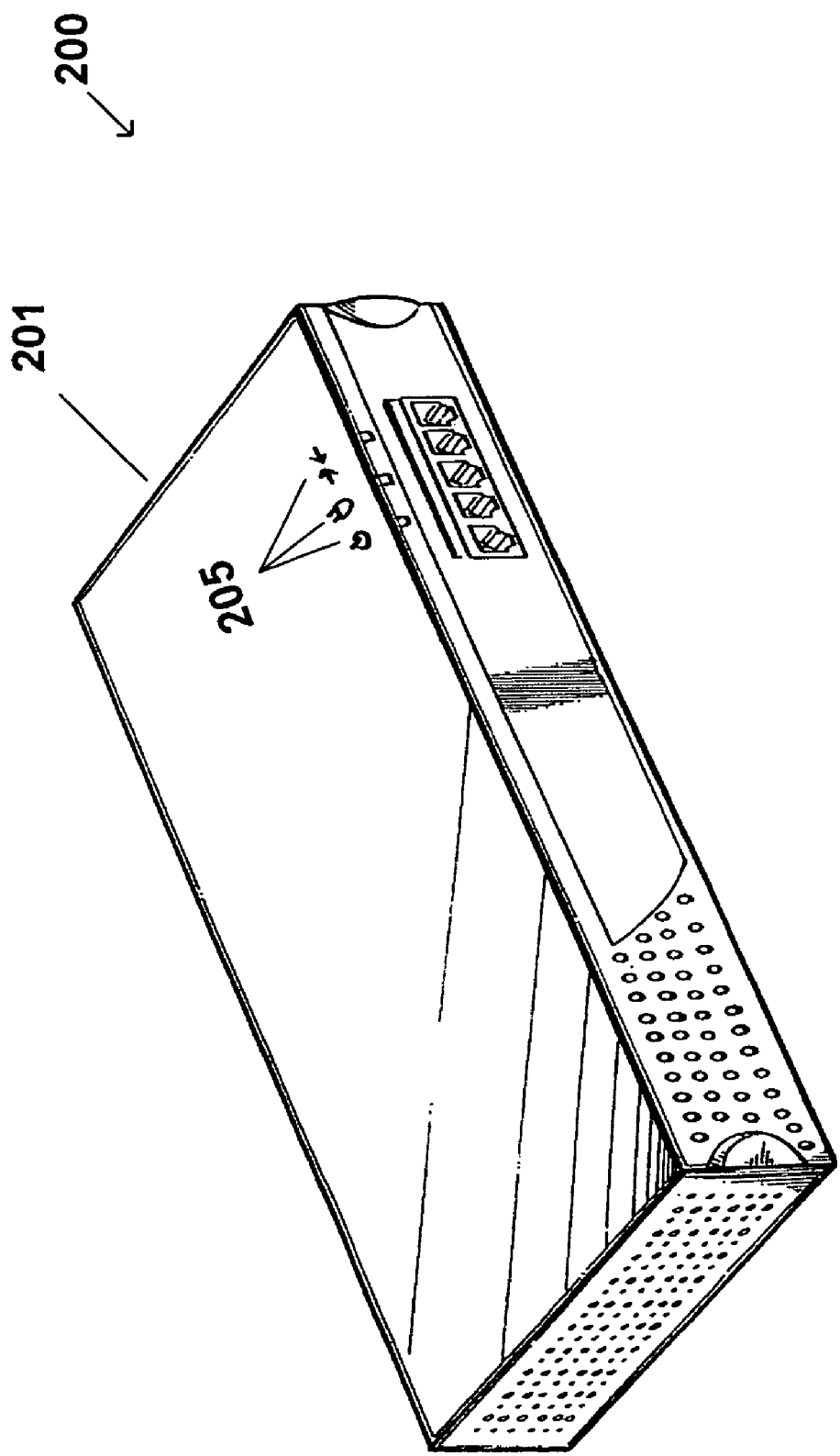
FIG. 2 is a simplified diagram of a power line gateway system according to an embodiment of the present invention.

FIG. 2 is a simplified diagram of a power line gateway system 200 according to an embodiment of the present invention. This diagram is merely an example, which should not unduly limit the scope of the claims herein. One of ordinary skill in the art would recognize many variations, alternatives, and modifications. As shown, the gateway system 200 has a housing 201 including at least three input/output ports 205, which can be coupled to external power lines according to a specific embodiment. In a specific embodiment, one or more power line signals is derived from the housing.

In a preferred embodiment, the power line signal coupled to each of the three input/output ports. That is, the power line signal is injected directly into each of the phases. In a specific embodiment, the present power line signal is injected directly into each of the phases, where the phases are not coupled to each other upon injection according to a specific embodiment. The three input/output ports include a first phase input/output port coupled to the first power line, a second phase input/output port coupled to the second power line, and a third input/output port coupled to the third power line. Of course, there can be other variations, modifications, and alternatives. Further details of the gateway system can be found throughout the present specification and more particularly below.

Figure 3:
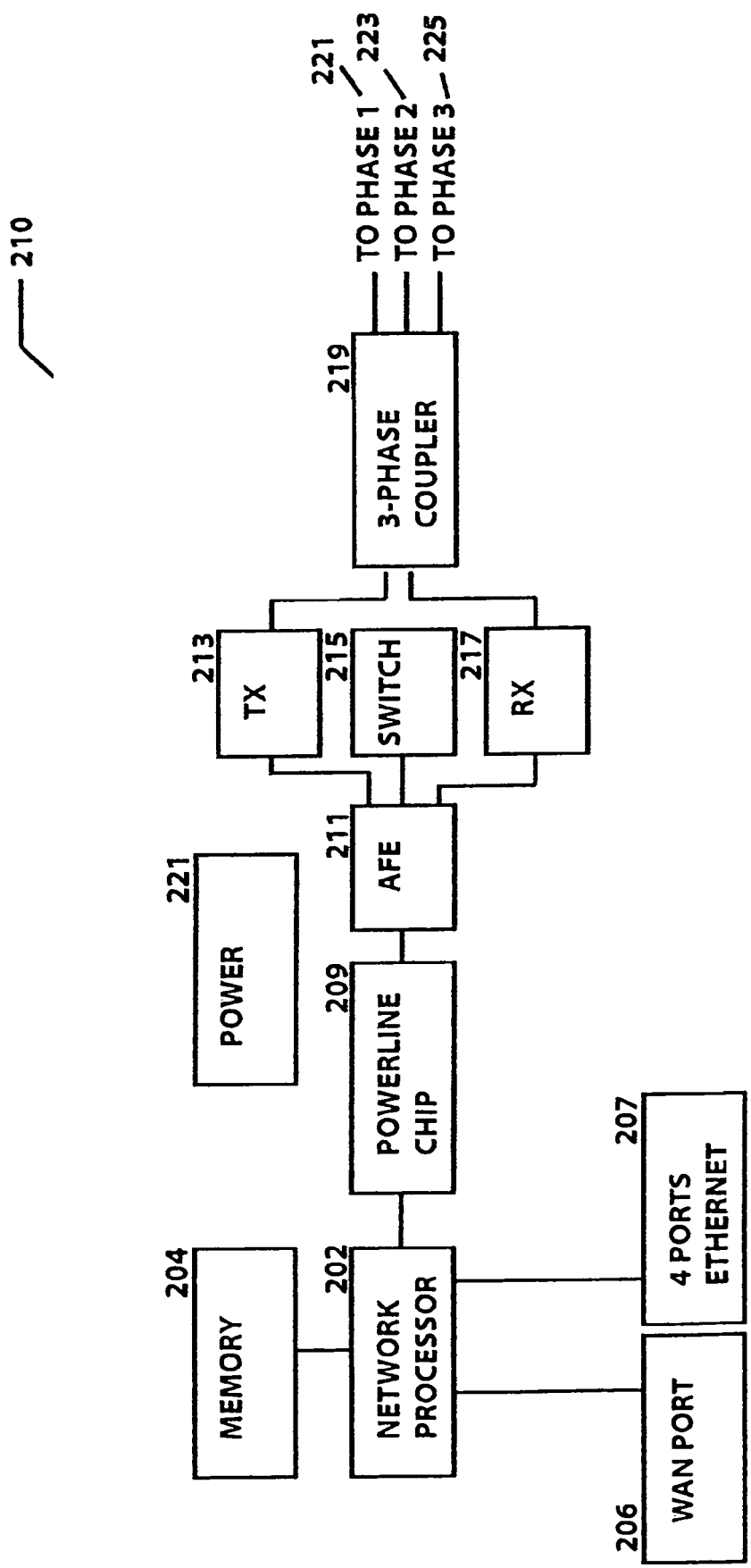
FIG. 3 is a simplified block diagram of the power line gateway system of FIG. 2 according to a specific embodiment.

FIG. 3 is a simplified block diagram 210 of the power line gateway system of FIG. 2 according to a specific embodiment. This diagram is merely an example, which should not unduly limit the scope of the claims herein. One of ordinary skill in the art would recognize many variations, alternatives, and modifications. As shown, the system has a network processor 202 within the housing and coupled to the power line signal via power line chip 209. In a specific embodiment, the network processor includes a network connector input/output port 206 coupled the network processor and coupled to the housing. In a preferred embodiment, the input/output port 206 couples to a data network, which couples to a wide area network and/or world wide area network, as noted. The network processor also includes one or more input/output ports for one or more local area networks 207. The network processor has an interface to a memory device 204, which can include a dynamic random access memory, static random access memory, or other types, depending upon the specific embodiment. As merely an example, the network processor can be any suitable type such as the ADM5120 Series manufactured by Infineon Technologies AG of Germany, but can also be others. In a specific embodiment, the system also has a power module 221, which provides suitable power (e.g., voltage/current) to each of the elements described herein. Of course, one of ordinary skill in the art would recognize other variations, modifications, and alternatives.

In a preferred embodiment, the system has the power line chip 209, called herein "PLC" chip, which is coupled between the network processor and analog front end 211 device. As shown, the PLC is coupled to the analog front end (AFE) module 211. The AFE module interfaces between the chipset and a three phase coupler 219 according to a specific embodiment. Between the AFE and coupler is transmit 213 and receive 217 devices according to a specific embodiment. A switching device couples to the AFE chip and transmit device according to a specific embodiment. Further details of the power line chip, AFE, TX/RX devices, and coupler are provided throughout the present specification and more particularly below.

In a specific embodiment, the power line device can be any suitable power line integrated circuit chips and/or chip sets. As merely an example, the power line chip is an integrated circuit chip sold under part number 5500CS manufactured by INTELLON CORPORATION of Florida. Here, the chip can be a single-chip power line networking controller with integrated MII/GPSI, USB. The chip interfaces with Ethernet interfaces, among others. Preferably, there is at least a 80 Mbps data rate on the power line, although others may desirable. Additional features include an Integrated 10-bit ADC, 10-bit DAC and AGC, a selectable MDI/SPI PHY management interface, general purpose 8-wire serial PHY data interface. Preferably, the signal processing uses Orthogonal Frequency Division Multiplexing (OFDM) for high data reliability, as well as adaptive channel characterization, Viterbi and block coding. In alternative embodiments, the power line device can also include other chip designs that are suitable for the present methods and systems. Of course, one of ordinary skill in the art would recognize other variations, modifications, and alternatives.

In a specific embodiment, the three phase coupler can be any suitable device capable of injecting power line signals directly into each of the three phases 221, 223, 225 independently. In a specific embodiment, the coupler can be an inductive coupler and/or capacitive coupler, but may be others. In a preferred embodiment, each of the three phases receives/transmits power line signals directly (and are not coupled to each other at the gateway or within a vicinity of the gateway) to more efficient signal transfer and receive processes. As merely an example, the coupler can be either inductive and/or capacitive, but can be others. As noted, the three phase coupler is merely an example and should not unduly limit the scope of the claims herein.

FIG. 4 is a simplified diagram of a power strip apparatus 400 according to an embodiment of the present invention. This diagram is merely an example, which should not unduly limit the scope of the claims herein. One of ordinary skill in the art would recognize many variations, alternatives, and modifications. As shown, the apparatus can be provided in housing 400, which can be stand alone according to a specific embodiment. As shown, the housing includes a power line device, which is provided in a module will be further described throughout the present specification and more particularly below. Various other elements are provided in the housing and/or enclosure according to an embodiment of the present invention.

In a specific embodiment, the powerline strip apparatus has input/output ports. Such input/output ports can include an RJ-11-type connector 413, an Ethernet connector 415 or connectors 415, 417, a wireless antenna 411, and others, if desired. The Ethernet connector often associated with a CAT 5-type connector. Each of these can be provided on a face of the apparatus. Of course, the connectors can also be provided on other spatial locations of the apparatus. The apparatus also includes one or more power outlets 403, 423 commonly termed AC outlets. The AC outlets are provided for AC power to any electronic devices that require such AC power. Depending upon the embodiment, one or more of the AC outlets 423 are "always on" and are not switched, after being plugged into the AC socket in a wall or other suitable location. In alternative embodiments, the AC outlets 403 are capable of being switched "on" or "off" via switching device 419, which is coupled between the AC outlets and power outlet cord 404 according to a specific embodiment. In a specific embodiment, the housing also has a switch 421 to turn "on" and turn "off" the power line module. The housing also has a DC power supply that provides power to the module. Each of these elements is provided within the housing, which includes at least the power outlet cord to be inserted into an AC power outlet provided in a power line network according to a specific embodiment. Of course, there can be other variations, modifications, and alternatives.

In a specific embodiment, the apparatus has a housing that is made of a suitable material such as a plastic or other material. The material can be molded and form the housing, which is often light weight and durable for use as a stand alone unit, which can be moved from one location to another. That is, the housing can be physically carried and provided in almost any type of physical environment. Depending upon the embodiment, the housing can be made using other types of outlet plugs, as shown in housing 450 and 475. In a specific embodiment, the various power strips include socket and power configurations suitable to meet country or regional standards, e.g., Japan, Europe, United States of America, China, Korea. Further details of the power strips can be found throughout the present specification and more particularly below. Of course, there can be other variations, modifications, and alternatives.

Figure 4A:
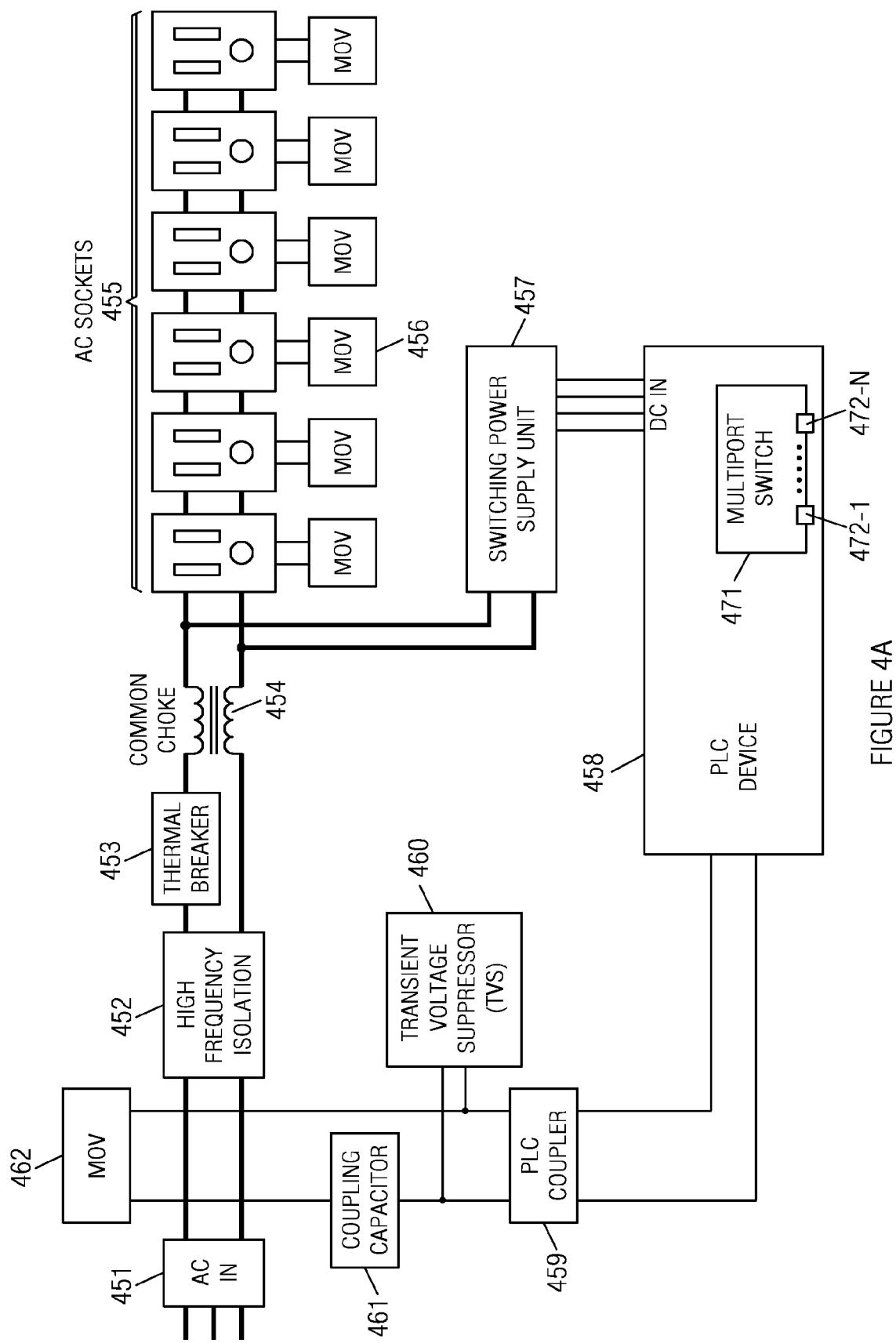
FIG. 4A is a simplified block diagram of a power line strip according to an embodiment of the present invention.

FIG. 4A is a simplified block diagram of a power line strip apparatus according to an embodiment of the present invention. This diagram is merely an example, which should not unduly limit the scope of the claims herein. One of ordinary skill in the art would recognize many variations, alternatives, and modifications. In a specific embodiment, the apparatus has a housing member, which includes an outer region and an inner region. The apparatus has an AC power line coupled to the housing member. In a specific embodiment, the AC power line includes a male connector device. Depending upon the embodiment, the AC power line can include two or three connectors, including power, ground, and neutral. Of course, there can be variations, modifications, and alternatives.

In a specific embodiment, the apparatus has a high frequency isolator 452 coupled between the power line and plurality of AC sockets 455. The high frequency isolator is adapted to remove high frequency noise that may be derived from the plurality of AC sockets, once one or more of them have been subjected to external power devices, e.g., computer, router, network equipment, display. In a specific embodiment, the apparatus also has a surge protector 453 coupled to the AC power line and AC sockets. In a specific embodiment, the surge protector is within a first portion of the inner region of the housing member. The surge protector can be any suitable design such as those manufactured by E-T-A USA at 1551 Bishop Court Mt. Prospect, Ill. 60056. In a specific embodiment, the apparatus also has a common choke 454, which is a coil. Of course, there can be other variations, modifications, and alternatives.

In a specific embodiment, the apparatus has one or more AC power outlets 455 coupled to the surge protector. In a specific embodiment, the one or more AC power outlets is spatially disposed on a first portion of the outer region of the housing member. An on/off switch is coupled between the one or more AC power outlets and the surge protector. In other embodiments, the AC power outlets are directly coupled to the power lines of the surge protector without any switch device to provide an "on" state. Of course, there can be other variations, modifications, and alternatives.

In a specific embodiment, the power line device 458 (or module) is coupled to the AC powerline. The power line device is adapted to process a data signal from the AC powerline in a first format to a second format according to a specific embodiment. The power line device has various outputs, including wireless, Ethernet, voice over IP, and others depending upon the embodiment. As also shown, the power line device is coupled to the incoming power line via transmit and receive lines. The device also has a coupling device 459 and capacitance coupler 461 according to a specific embodiment. The device also has a transient voltage suppressor 460 to reduce and/or suppress any electrostatic discharge influences according to a specific embodiment. Additionally, the device has various MOV devices 462 456 coupled to one or more portions of the AC power elements according to a specific embodiment. The MOV devices are provided for voltage clamping of high transient surge currents from sources, e.g., lighting, inductive load switching, or capacitor bank switching and other applications. An example of such MOV devices are those sold as UltraMOV™ Varistor Series Products from Littelfuse Inc., but can be others. A switching power supply 458 is coupled to the AC powerline and is provided after the common choke according to a specific embodiment. The switching power supply is adapted to convert an AC power signal into a DC signal for use with the power line device, as shown.

A multi-port switch (or switch device) 471 can be coupled to or provided in the power line device 458 according to a specific embodiment. The multi-port switch 471 is adapted to couple to the data signal in the second format. In a specific embodiment, the multiport switch has a first output 472-1 and an Nth output 472-N, where N is an integer greater than 1. Depending upon the embodiment, the input/outputs can be Ethernet, wireless, voice over IP, and other formats. In a specific embodiment, the power line device can also be provided with an external switch to turn it "on" and "off." Further details of the power line device can be found throughout the present specification and more particularly below.

Figure 5:
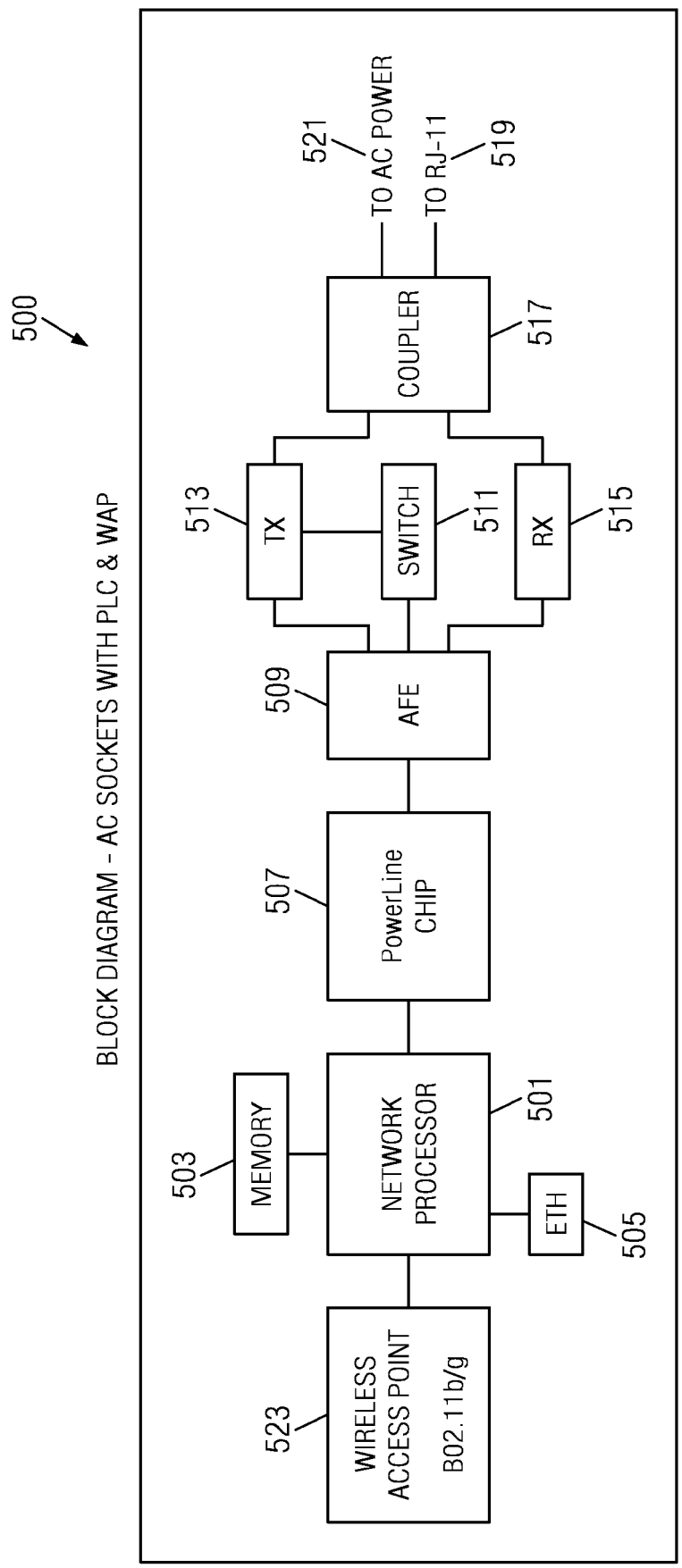
FIG. 5 is a simplified block diagram of a power line module for the power line strip according to an embodiment of the present invention.

FIG. 5 is a simplified block diagram of a power line module provided in the housing according to an embodiment of the present invention. This diagram is merely an example, which should not unduly limit the scope of the claims herein. One of ordinary skill in the art would recognize many variations, alternatives, and modifications. In a preferred embodiment, the module is provided within a interior region of the housing. As shown, the module has a network processor 501 within the housing and coupled to the power line signal via power line chip 507. In a specific embodiment, the network processor includes one or more input/output ports for one or more local area networks via line or lines 521. In a specific embodiment, the local area network can be Ethernet and/or other like technology. The network processor has an interface to a memory device 505, which can include a dynamic random access memory, static random access memory, or other types, depending upon the specific embodiment. As merely an example, the network processor can be any suitable type such as the ADM5120 Series manufactured by Infineon Technologies AG of Germany, but can also be others. Of course, one of ordinary skill in the art would recognize other variations, modifications, and alternatives.

In a preferred embodiment, the system has the power line chip 507, called herein "PLC" chip, which is coupled between the network processor and an analog front end 509 device. As shown, the PLC is coupled to the analog front end (AFE) device and/or module. The AFE module interfaces between the PLC chip and a phase coupler 519 according to a specific embodiment. Between the AFE and coupler is transmit 513 and receive 515 devices according to a specific embodiment. A switching device 511 couples to the AFE chip and transmit device according to a specific embodiment. Further details of the power line chip, AFE, TX/RX devices, and coupler are provided throughout the present specification and more particularly below.

In a specific embodiment, the power line device can be any suitable power line integrated circuit chips and/or chip sets. As merely an example, the power line chip is an integrated circuit chip sold under part number 5500CS manufactured by INTELLON CORPORATION of Florida. Here, the chip can be a single-chip power line networking controller with integrated MII/GPSI, USB. The chip interfaces with Ethernet interfaces 505, among others. Preferably, there is at least a 80 Mbps data rate on the power line, although others may desirable. Additional features include an Integrated 10-bit ADC, 10-bit DAC and AGC, a selectable MDI/SPI PHY management interface, general purpose 8-wire serial PHY data interface. Preferably, the signal processing uses Orthogonal Frequency Division Multiplexing (OFDM) for high data reliability, as well as adaptive channel characterization, Viterbi and block coding. In alternative embodiments, the power line device can also include other chip designs that are suitable for the present methods and systems. Of course, one of ordinary skill in the art would recognize other variations, modifications, and alternatives.

In a specific embodiment, the coupler 517 can be any suitable device capable of injecting and/or receiving power line signals to and/from a power line, which is coupled to a power line network. In a specific embodiment, the coupler can be an inductive coupler and/or capacitive coupler, but may be others. As merely an example, the coupler (either inductive and/or capacitive coupler), but can be others. The coupler couples to AC power line 521, which is provided on the powerline network. Additionally, the coupler or other coupling device is coupled to an RF-11 outlet 519 for telephone communication. Of course, there can be many variations, modifications, and alternatives.

In an optional specific embodiment, the network processor is also coupled to wireless access point device 523. The wireless access point device can be any suitable integrated circuit chip and/or chips, including modules, according to a specific embodiment. The wireless access point device can be an 802.11-type device or other type of wireless transmission/receive device according to a specific embodiment. The wireless access device is coupled to the wireless antenna according to a specific embodiment. Of course, there can be other variations, modifications, and alternatives.

Figure 6:
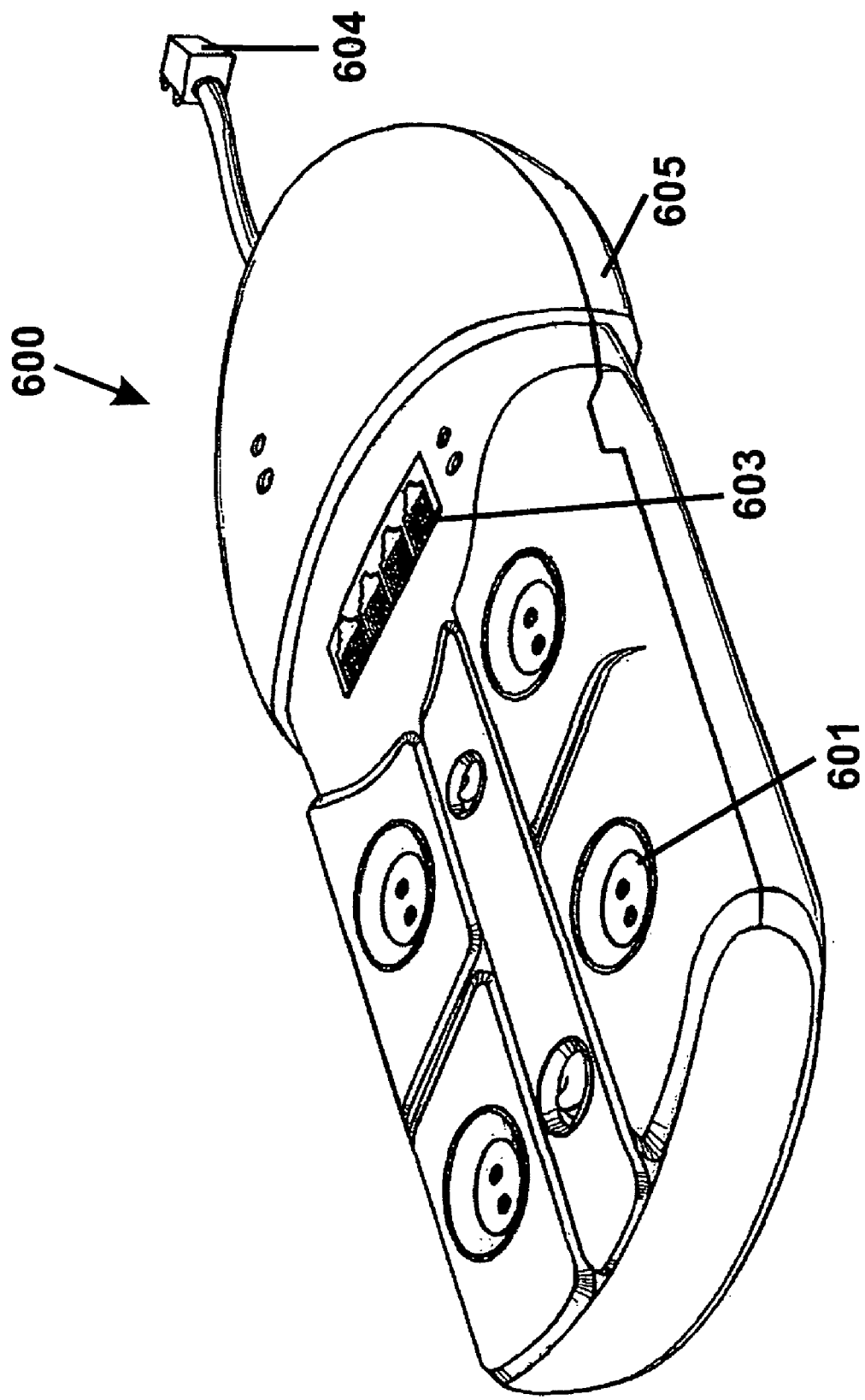
FIGS. 6 through 8 are simplified diagrams illustrating power strips according to an embodiment of the present invention.
Figure 7:
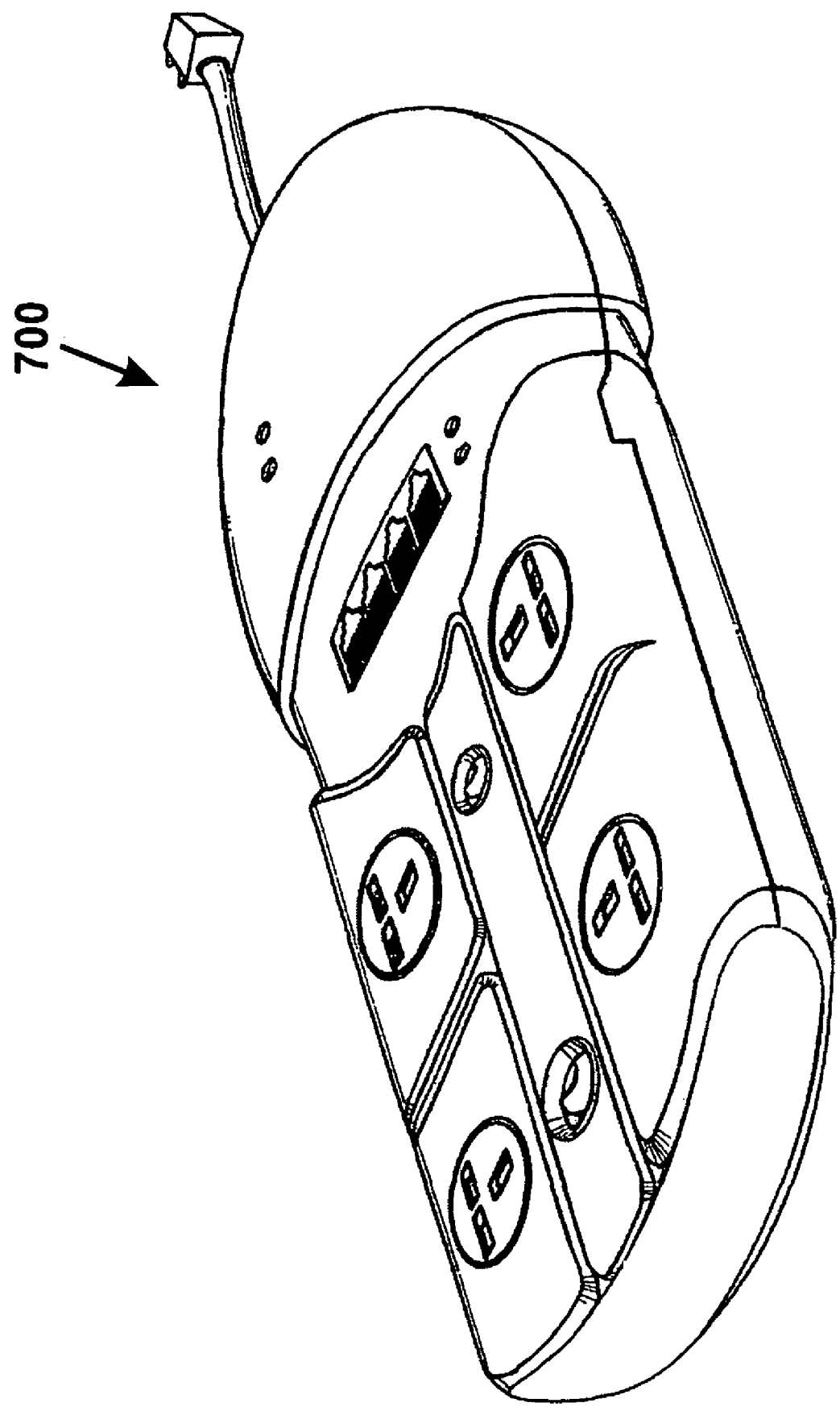
Figure 8:
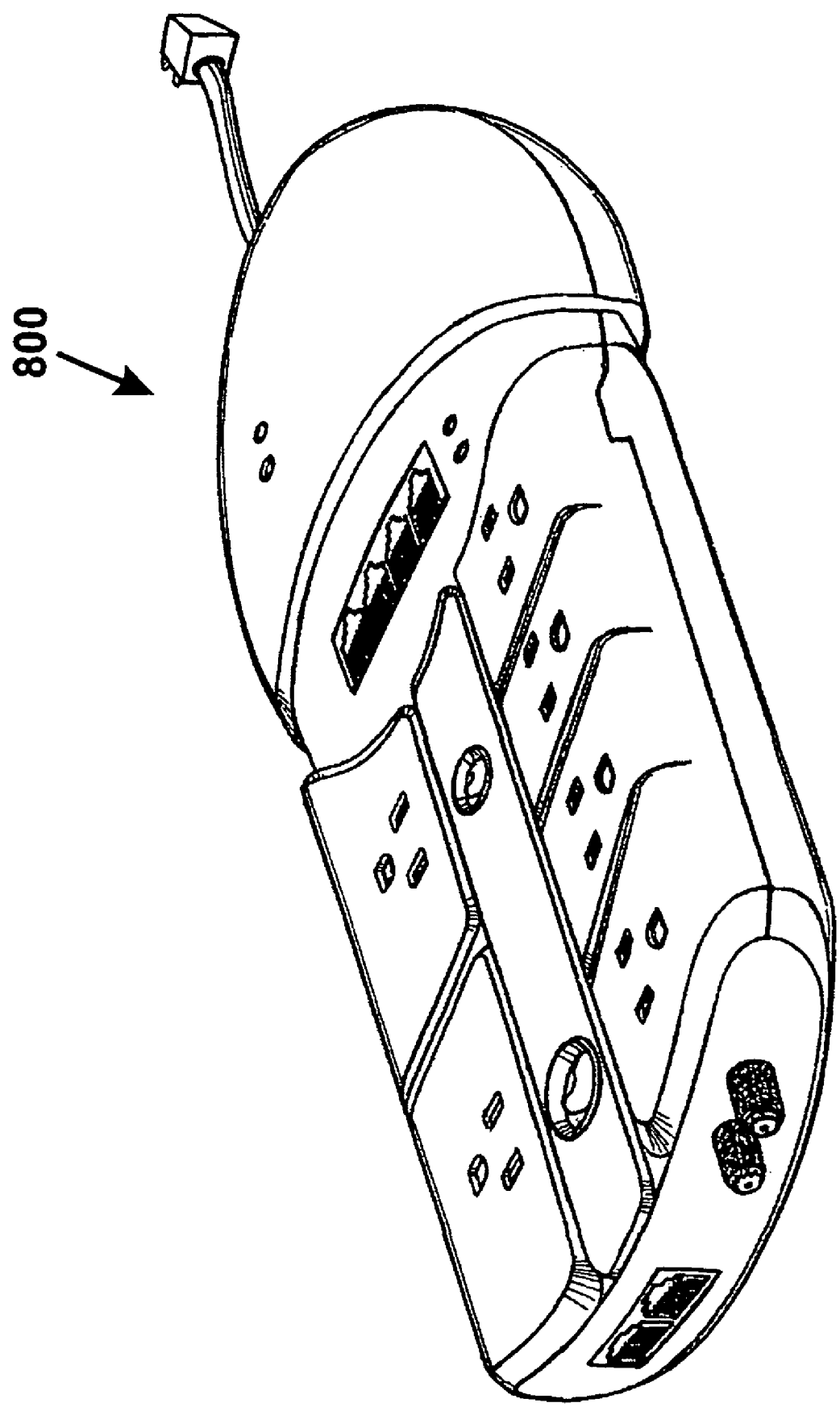

FIGS. 6 through 8 are simplified diagrams illustrating power strips according to embodiments of the present invention. These diagrams are merely examples, which should not unduly limit the scope of the claims herein. One of ordinary skill in the art would recognize many variations, modifications, and alternatives. As shown, the strip 600 includes a plurality of AC outlets 601 provided on a face portion of an enclosure 605 according to a specific embodiment. The enclosure also includes a plurality of Ethernet ports 603, which couple to cabling for networking applications. The power strip also has power plug 604, which couples to a power line network. Of course, there can be other variations, modifications, and alternatives.

Referring now to FIG. 7, the enclosure 700 includes a plurality of AC outlets provided on a face portion of an enclosure according to a specific embodiment. The enclosure also includes a plurality of Ethernet ports, which couple to cabling for networking applications. The power strip also has power plug, which couples to a power line network. Referring now to FIG. 8, the enclosure 800 includes a plurality of AC outlets provided on a face portion of an enclosure according to a specific embodiment. The enclosure also includes a plurality of Ethernet ports, which couple to cabling for networking applications. The power strip also has power plug, which couples to a power line network. The enclosure can include the powerline module, which has been previously described according to a specific embodiment. Other elements described here as well as outside of the specification and also be included. The enclosure can also include voice over IP, wireless, and other communication devices. Additionally, the enclosure, which is also a housing, can be made of any suitable material such as a firm plastic, which is insulating, or a combination of materials. As also noted, the various power strips include socket and power configurations suitable to meet country or regional standards, e.g., Japan, Europe, United States of America, China, Korea. Of course, there can be other variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A powerstrip apparatus having powerline networking capability, the power strip apparatus comprising:
   a housing member, the housing member including an outer region and an inner region;
   an AC power line coupled to the housing member, the AC powerline including a male connector device;
   a surge protector coupled to the AC power line, the surge protector within a first portion of the inner region of the housing member;
   one or more AC power outlets coupled to the surge protector, the one or more AC power outlets being spatially disposed on a first portion of the outer region of the housing member;
   an on/off switch coupled between the one or more AC power outlets and the surge protector;
   a powerline coupler for coupling a power line device to the AC powerline, wherein the coupling of the power line device to the AC powerline is achieved using three phases, wherein a data signal from the AC powerline is injected directly into each of the three phases, and wherein the three phases are not coupled to each other upon the injection;
   the power line device coupled to the AC powerline, the power line device being adapted to process the data signal from the AC powerline in a first format to a second format;
   a switching power supply coupled to the AC powerline, the switching power supply being adapted to convert an AC power signal into a DC signal for use with the power line device; and
   a multi-port switch coupled to the power line device, the multi-port switch being adapted to couple to the data signal in the second format, the multiport switch having a first output and an Nth output, where N is an integer greater than 1.

2. The apparatus of claim 1 wherein the first port comprises an Ethernet port.

3. The apparatus of claim 1 wherein the first port comprises a VoIP port.

4. The apparatus of claim 1 further comprising a noise cancellation filter coupled to the one or more AC outlets, the noise cancellation filter being adapted to remove high frequency noise of about 1 Mega-Hertz and greater.

5. The apparatus of claim 1 further comprising a noise cancellation filter coupled to the one or more AC outlets, the noise cancellation filter being adapted to remove high frequency noise ranging from about 1 Mega-Hertz to about 20 MegaHertz, the high frequency noise being derived through the one or more AC outlets.

6. The apparatus of claim 1 wherein the surge protector comprises a transient voltage suppressor, the transient voltage suppressor being adapted to remove one or more electrostatic discharge effects.

7. The apparatus of claim 1 wherein the first output and the second output are spatially disposed, respectively, on a third portion and a fourth portion of the out region of the housing member.

8. The apparatus of claim 1 wherein the outer region of the housing member is made of a rigid plastic material.

9. The apparatus of claim 1 wherein the first format is an OFDM format.

10. A power strip apparatus having power line networking capability, the power strip apparatus comprising:

a housing member, the housing member including an outer region and an inner region;

an AC power line coupled to the housing member, the AC power line including a male connector device;

a surge protector coupled to the AC power line, the surge protector within a first portion of the inner region of the housing member;

one or more AC power outlets coupled to the surge protector, the one or more AC power outlets being spatially disposed on a first portion of the outer region of the housing member;

an on/off switch coupled between the one or more AC power outlets and the surge protector, the on/off switch being adapted to turn "on" or "off" the one or more AC power outlets;

a power line device coupled to the AC power line, the power line device being adapted to process a data signal from the AC power line in a first format to a second format;

a powerline coupler for coupling the power line device to the AC powerline, wherein the coupling of the power line device to the AC powerline is achieved using three phases, wherein the data signal from the AC powerline is injected directly into each of the three phases, and wherein the three phases are not coupled to each other upon the injection;

a switching power supply coupled to the AC power line, the switching power supply being adapted to convert an AC power signal into a DC signal for use with the power line device;

a first output port coupled to an first input/output of the PLC device; and an Nth output port coupled to a second input/output of the PLC device; where N is an integer greater than 1.

11. A method of using a power strip apparatus having power line networking capability, the method comprising:

providing a housing member, the housing member including an outer region and an inner region, the housing member also including an AC power line coupled to the housing member, the AC power line including a male connector device;

supplying AC power to the power line and through a surge protector coupled to the AC power line, the surge protector within a first portion of the inner region of the housing member;

transferring the AC power from the powerline after the surge protector to one or more AC power outlets coupled to the surge protector, the one or more AC power outlets being spatially disposed on a first portion of the outer region of the housing member;

coupling, in three phases, the AC power line to a power line device for transferring at least a data signal, wherein the data signal from the AC powerline is injected directly into each of the three phases, and wherein the three phases are not coupled to each other upon the injection;

transferring the data signal in a first format from the AC power line to the power line device coupled to the AC power line, the power line device being adapted to process the data signal from the AC power line in the first format to a second format;

transferring one or more first portions of the data signal in the second format to a first output port coupled to an first input/output of the PLC device; and transferring one or more Nth portions of the data signal in the second format to an Nth output port coupled to a second input/output of the PLC device; where N is an integer greater than 1.

* * * * *